UNITED STATES PATENT OFFICE.

WILLIAM V. B. AMES, OF CHICAGO, ILLINOIS.

CEMENT INGREDIENT.

No. 923,238.  Specification of Letters Patent.  Patented June 1, 1909.

Application filed January 11, 1908. Serial No. 410,451.

*To all whom it may concern:*

Be it known that I, WILLIAM V. B. AMES, citizen of the United States, residing at Chicago, in the county of Cook and State of Illinois, have invented a certain new and useful Improvement in Cement Ingredients, of which the following is a full, clear, concise, and exact description.

My invention relates to the production of cement, and has for one of its objects the formation of a new cement ingredient which, when mixed with another cement ingredient (a suitable one being commonly found upon the market), will produce a superior form of cement, and has for another of its objects the provision of a process for producing the cement ingredient of my invention.

In the preferred practice of my invention, I employ phosphoric acid, a metal or a metal compound, preferably aluminum phosphate, and a fluosilicate, such as hydrofluosilicic acid or a salt of that acid. In practicing my invention, I have presented these materials to each other in substantially the following proportions by weight: 4 parts of 85% phosphoric acid; 1 part of aluminum phosphate; 1 part of hydrofluosilicic acid. A cement ingredient results from the reaction of these materials which includes phosphoric acid, aluminum phosphate, a fluorin compound (hydrofluoric acid) and silicic acid. This ingredient, when intermixed with some well-known cement ingredients found upon the market, will produce a superior form of cement which is well adapted for dental purposes, though I do not wish to be limited to the use to which my invention may be put. Cement ingredients found upon the market with which the cement ingredient of my invention may be intermixed are zinc oxid or a mixture including the oxids of calcium, silicon and aluminum.

By way of example, the desired cement may be produced by intermixing 175 M g. of the ingredient of my present invention with 400 M g. of zinc oxid. By way of another example, I may employ 175 M g. of the ingredient of my present invention with 300 M g. of a well known compound formed by the fusion of the oxids of calcium, silicon and aluminium. The mixture is effected by spatulation in a manner familiar to dentists.

In the practice of the process of my invention, the quantity of phosphoric acid supplied is in excess, so that a quantity may remain in which to hold the substances that have been chemically formed by the materials that I employ. The phosphoric acid, the hydrofluoric acid and the aluminum phosphate form a solution in which the silicic acid is held in suspension. The phosphoric acid also serves to react upon the commercial cement ingredient with which the cement ingredient of my invention is to be intermixed to produce a cement.

The cement ingredient of my invention, as a whole, is somewhat of a gelatinous nature.

Having thus described my invention, I claim as new and desire to secure by Letters Patent:—

1. The herein described composition of materials for making a cement ingredient, consisting of phosphoric acid, an aluminum phosphate, and a fluosilicate.

2. The herein described composition of materials for making a cement ingredient, consisting of phosphoric acid, a metal phosphate, and a fluosilicate.

3. The herein described composition of materials for making a cement ingredient, consisting of phosphoric acid, a metal compound, and a fluosilicate.

4. The herein described composition of materials for making a cement ingredient, consisting of phosphoric acid, an aluminum compound, and a fluosilicate.

5. The process of producing a cement ingredient, which consists in presenting phosphoric acid, aluminum phosphate, and a fluosilicate to each other.

6. The process of producing a cement ingredient, which consists in presenting phosphoric acid, aluminum or an aluminum compound, and a fluosilicate to each other.

7. The process of producing a cement ingredient, which consists in presenting phosphoric acid, a metal phosphate, and a fluosilicate to each other.

8. The process of producing a cement ingredient, which consists in presenting phosphoric acid, a metal or metal compound, and a fluosilicate to each other.

In witness whereof, I hereunto subscribe my name this 3rd day of January A. D., 1908.

WILLIAM V. B. AMES.

Witnesses:
G. L. CRAGG,
L. G. STROH.